United States Patent
Gretz

(10) Patent No.: US 8,759,676 B1
(45) Date of Patent: Jun. 24, 2014

(54) ELECTRICAL BOX ASSEMBLY FOR CONCRETE POURED FLOORS

(71) Applicant: Thomas J. Gretz, Port St. Lucie, FL (US)

(72) Inventor: Thomas J. Gretz, Port St. Lucie, FL (US)

(73) Assignee: Arlington Industries, Inc., Scranton, PA (US)

( * ) Notice: Subject to any disclaimer, the term of this patent is extended or adjusted under 35 U.S.C. 154(b) by 172 days.

(21) Appl. No.: 13/621,593

(22) Filed: Sep. 17, 2012

(51) Int. Cl.
*H01J 5/00* (2006.01)
(52) U.S. Cl.
USPC .................. 174/50; 174/58; 174/66; 439/535; 248/906
(58) Field of Classification Search
USPC .................. 174/50, 58, 66; 439/535; 248/906
See application file for complete search history.

(56) References Cited

U.S. PATENT DOCUMENTS

| | | | |
|---|---|---|---|
| 5,466,886 A | 11/1995 | Lengyl et al. | |
| 6,878,877 B1 * | 4/2005 | Cozzi et al. | 174/53 |
| 7,388,164 B2 | 6/2008 | Scanzillo | |
| 7,449,633 B2 | 11/2008 | Lalancette et al. | |
| 7,563,978 B2 | 7/2009 | Lalancette et al. | |
| 7,825,335 B2 | 11/2010 | Carbone et al. | |
| 7,902,459 B2 * | 3/2011 | Lehr | 174/67 |

* cited by examiner

*Primary Examiner* — Dhirubhai R Patel

(57) ABSTRACT

An electrical box assembly for concrete poured floors. The electrical box assembly includes a concrete can with an open end and a plurality of hubs with integral sockets for connection of electrical conduit thereto. Plugs are provided for closing off unused sockets. The electrical box assembly includes a mounting bracket for installation on the open end of the can, a duplex receptacle, a back plate and a cover plate. The back plate provides a seal between the mounting bracket and the cover plate. Removable threaded blanks are included for sealing the openings in the cover plate in order to gain access to the plug-ins on the duplex receptacle.

19 Claims, 9 Drawing Sheets

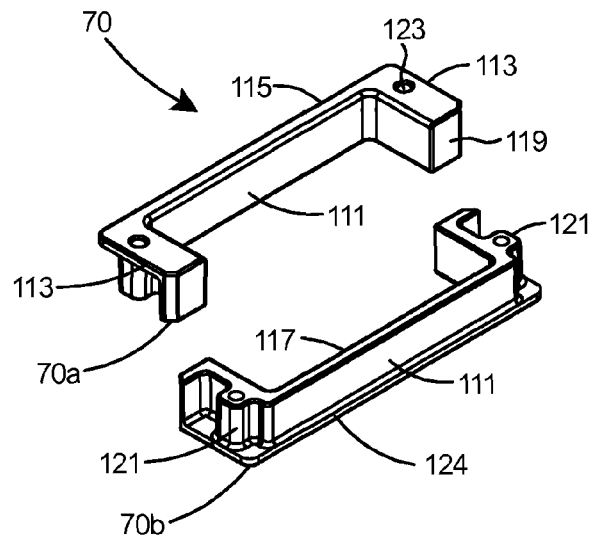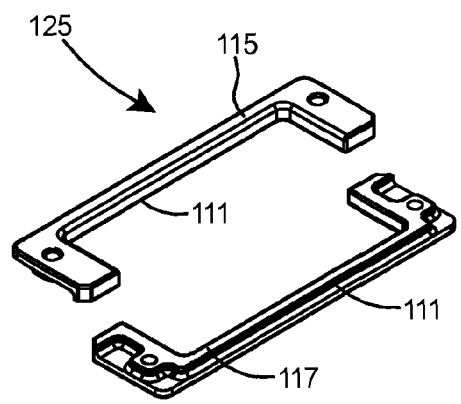
Fig. 10
Fig. 11
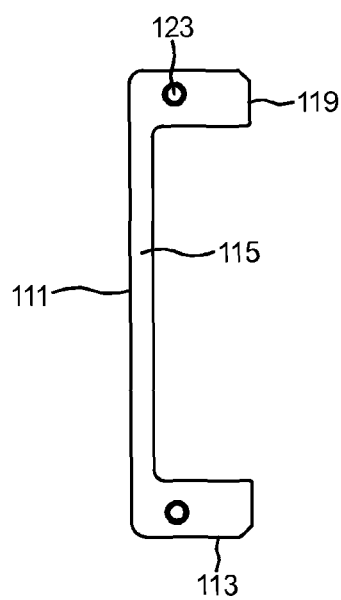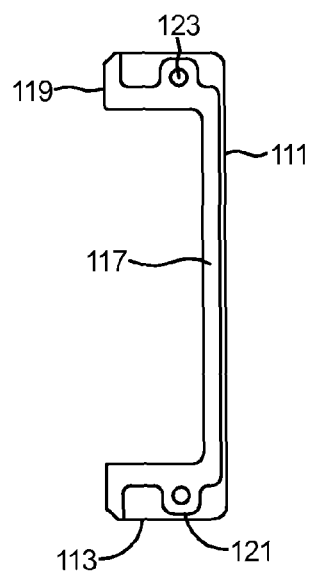
Fig. 12
Fig. 13

ELECTRICAL BOX ASSEMBLY FOR CONCRETE POURED FLOORS

FIELD OF THE INVENTION

This invention relates to electrical box assemblies for mounting electrical components and specifically to an electrical box assembly for mounting an electrical component in newly poured concrete.

BACKGROUND OF THE INVENTION

It is a common desire in residential and commercial construction to install electrical components such as duplex receptacles in concrete floors where they provide a convenient location to plug into the electrical supply. Conventional electrical boxes for installation in concrete are typically constructed of metal. Unfortunately, metal electrical boxes are not ideal for installation in poured concrete. Metal electrical boxes are susceptible to damage from moisture or water seepage, which over time can cause rusting which may compromise the integrity of the electrical box. Secondly, metal electrical boxes have become expensive to manufacture as a result of the high price of metal and the substantial secondary operations to construct the metal box, such as welding or assembly with screws. Also, as a result of the desire to minimize the cost of metal electrical boxes, manufacturers attempt to reduce the thickness of the walls of the box, and this can lead to crushing of the walls when heavy concrete is poured around the box.

What is needed therefore is an electrical box assembly for installation in an area that will be poured with concrete. The electrical box assembly should have the strength and integrity to withstand immersion in poured concrete without crushing or damage to the box. The electrical box should be constructed of materials that are not susceptible to corrosion damage caused by moisture or water seepage. The electrical box assembly should be capable of being manufactured at an economical price. Lastly, the electrical box assembly should include a means for adjusting the height of the installed box to adapt to the final floor thickness, such as occurs when carpet, tile, or similar floor coverings are installed on the concrete floor.

SUMMARY OF THE INVENTION

The invention is an electrical box assembly for concrete poured floors. The electrical box assembly includes a nonmetallic concrete can with an open end and a plurality of hubs with integral sockets for connection of electrical conduit thereto. Plugs are provided for closing off unused sockets. The electrical box assembly includes a mounting bracket for installation on the open end of the can, a duplex receptacle, a back plate and a cover plate. The back plate provides a seal between the mounting bracket and the cover plate. Removable threaded blanks are included for sealing the openings in the cover plate in order to gain access to the plug-ins on the duplex receptacle.

OBJECTS AND ADVANTAGES

The electrical box assembly for concrete poured floors provides several advantages over the prior art, including:
(1) The electrical box assembly can be manufactured at a more economical price than a conventional metal electrical box assembly.
(2) The electrical box assembly includes rigid walls having the strength and integrity to withstand immersion in poured concrete without crushing or damage.
(3) The electrical box assembly is constructed of materials that are not susceptible to corrosion damage caused by moisture or water seepage.
(4) The electrical box assembly includes a means for adjusting the height of the installed box to adapt to the final floor thickness.

These and other objects and advantages of the present invention will be better understood by reading the following description along with reference to the drawings.

DESCRIPTION OF THE DRAWINGS

FIG. 10 is a perspective view of a pair of spacers that form a portion of the electrical box assembly of FIG. 1.

FIG. 11 is a perspective view of a second embodiment of a pair of spacers.

FIG. 12 is a front elevation view of a spacer according to the present invention.

FIG. 13 is a rear view of the spacer of FIG. 12.

DETAILED DESCRIPTION OF THE INVENTION

Figure 1:
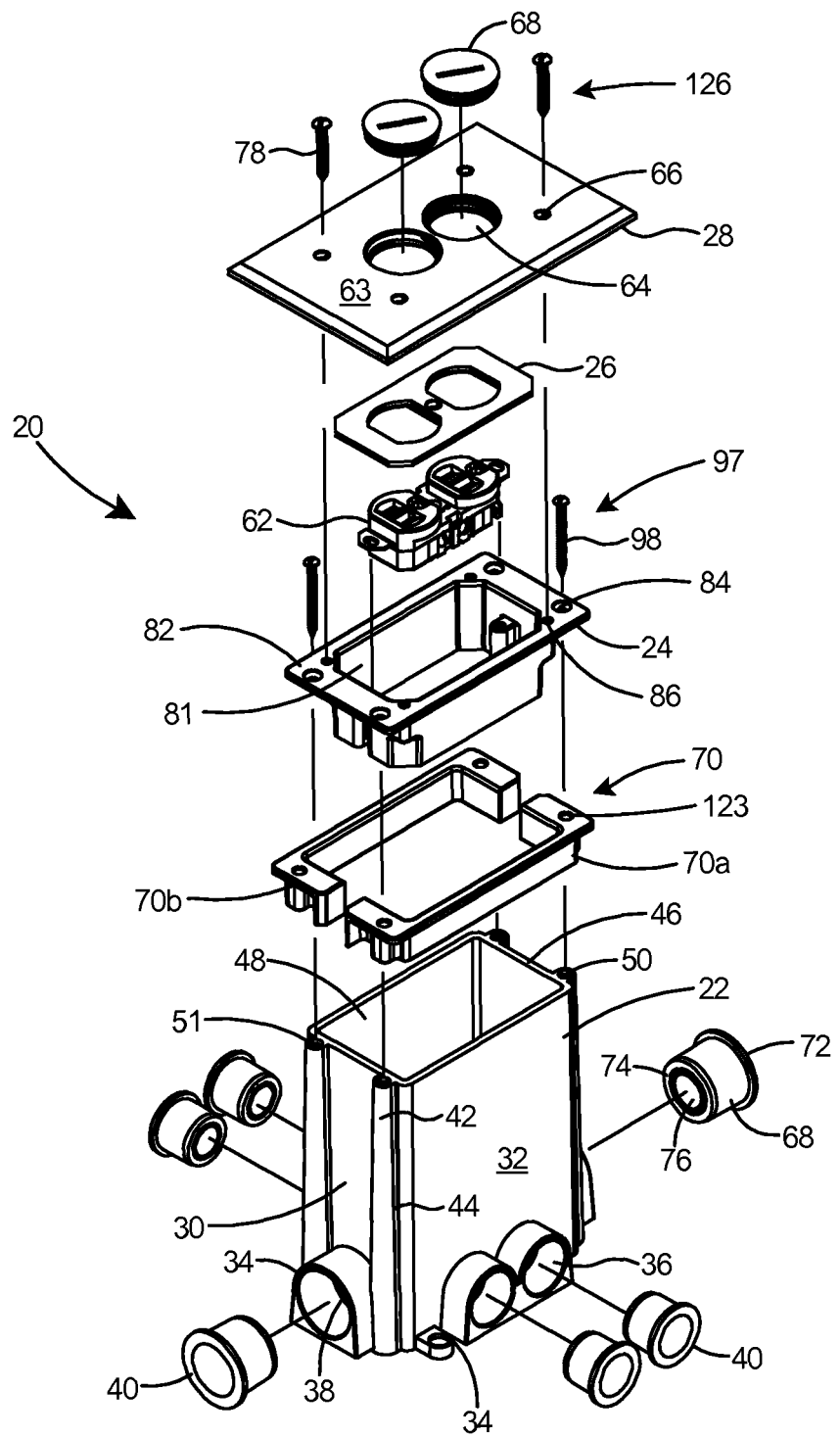
FIG. 1 is an exploded perspective view of an electrical box assembly for concrete poured floors according to the present invention.

With reference to FIG. 1 there is shown a preferred embodiment of an electrical box assembly 20 for concrete poured floors according to the present invention. The electrical box assembly 20 includes a concrete can 22, a mounting bracket 24, a back plate 26, and a cover plate 28. The concrete can 22 includes two end walls 30, two side walls 32, and a plurality of hubs 34 with sockets 36 therein extending from the sidewalls. The sockets 36 include openings 38 therein and the concrete can 22 may include one or more plugs 40 to block off any unused openings in the sidewalls. Two stiffening ribs 42 extend longitudinally along each end wall 30 of the concrete can 22 near the corner 44 of the sidewalls. The concrete can 22 includes a top edge 46 and a cavity 48 therein. Each stiffening rib 42 terminates in a flat face 50 that is level with the top edge 46. Each flat face 50 includes a bore 51 therein.

Figure 14:
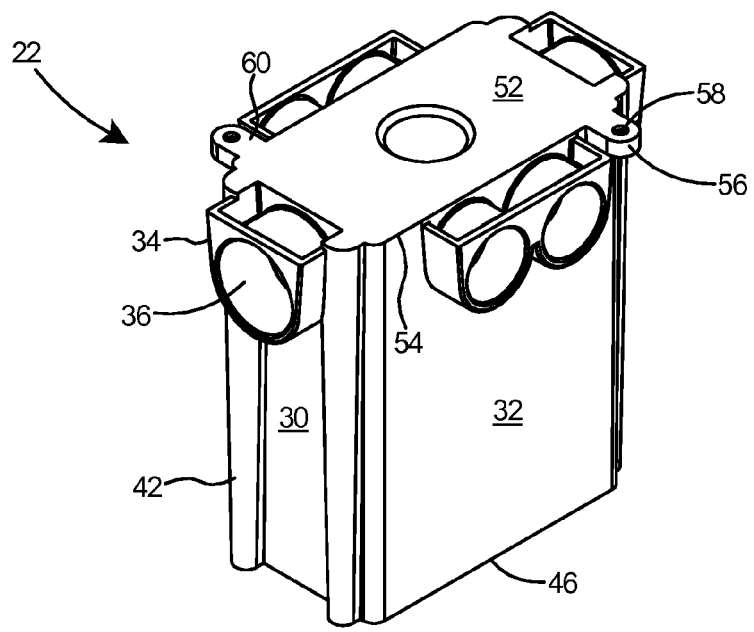
FIG. 14 is a rear perspective view of the concrete can portion of the electrical box assembly of the present invention.

Referring to FIG. 14, the concrete can 22 further includes a back wall 52, a bottom edge 54 at the juncture of the sidewalls 30 and 32 and the back wall, and an anchor leg 56 having an aperture 58 therein extending outwards from the bottom edge 54. The bottom surface 60 of the each anchor leg 56 is level with the back wall 52.

With reference to FIG. 1, the electrical box assembly 20 is used to mount an electrical component in a concrete poured floor such as the duplex connector 62 shown. Cover plate 28 includes a top surface 63, two threaded openings 64 therein, and a plurality of apertures 66. Two threaded blanks 68 are provided for closing the threaded openings 64 in the cover plate 28. The electrical box assembly may further include a pair of spacers 70 as will be described herein with reference to a preferred embodiment.

Figure 2:
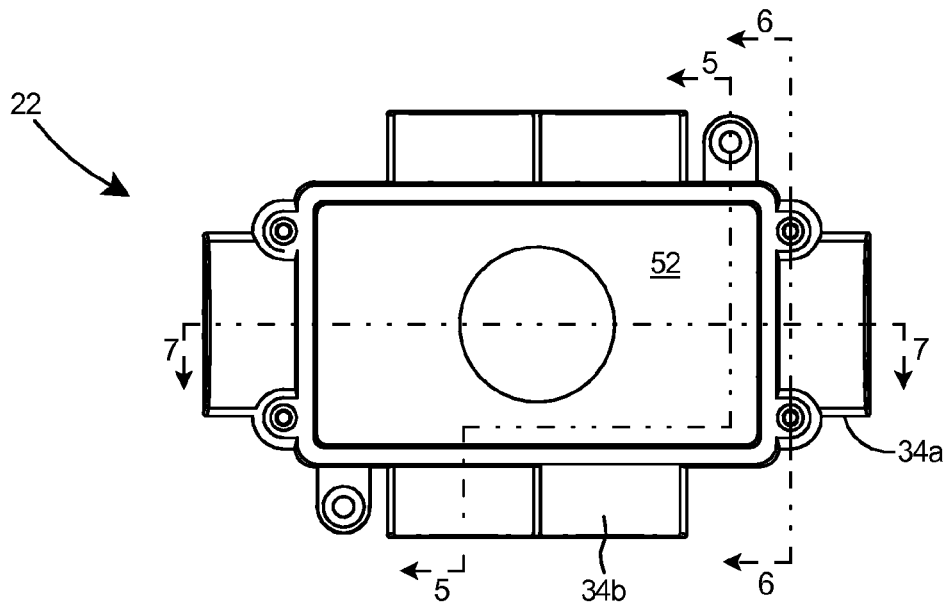
FIG. 2 is a front view of a concrete can that forms a portion of the electrical box assembly of FIG. 1.
Figure 3:
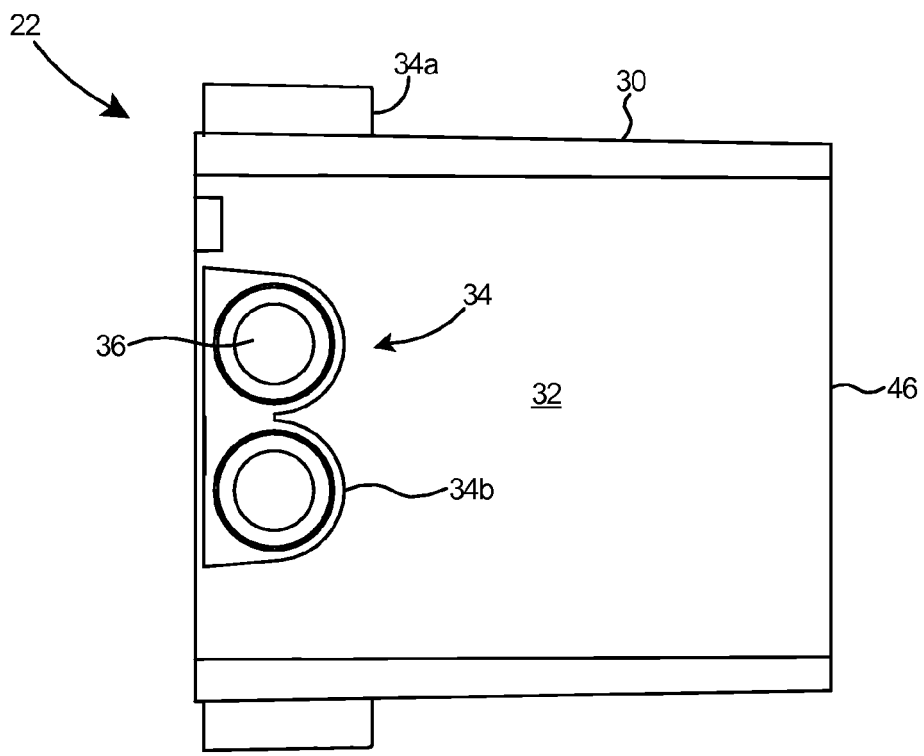
FIG. 3 is a first side view of the concrete can.
Figure 4:
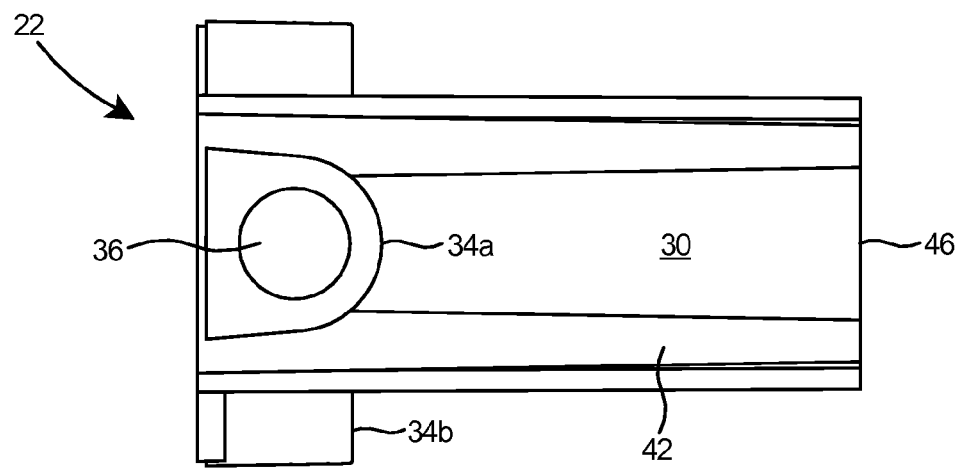
FIG. 4 is a second side view of the concrete can.
Figure 5:
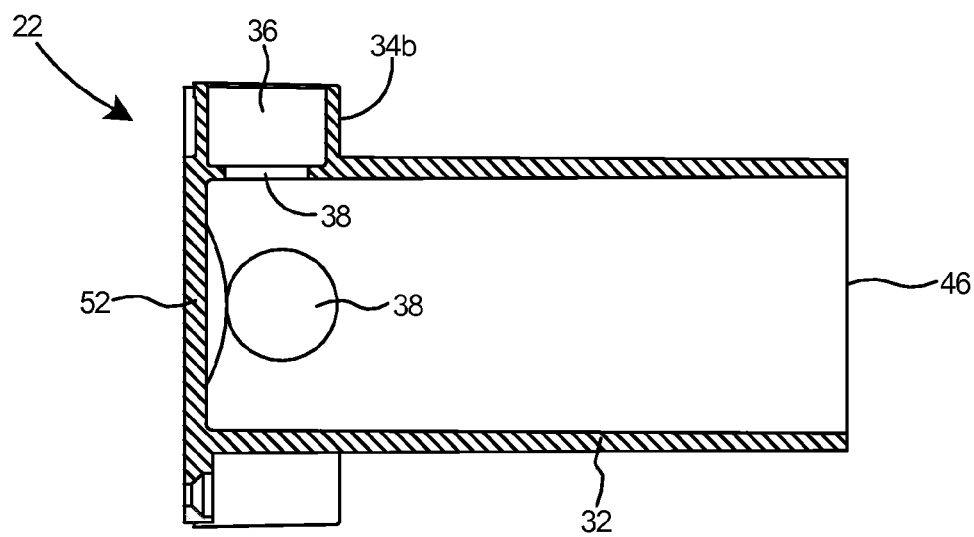
FIG. 5 is a sectional view of the concrete can taken along line 5-5 of FIG. 2.

Referring to FIGS. 2 and 3, the sockets 36 within hubs 34 are sized to accept various trade sizes of electrical conduit (not shown). The end walls 30 include large hubs 34a to accommodate most preferably 1-inch diameter conduit (not shown) and the side walls 32 include small hubs 34b to accommodate most preferably ¾-inch conduit, although the hubs could be provided in other trade sizes as well. Most preferably, the concrete can includes hubs to accommodate at least two diameters of electrical conduit.

Figure 17:
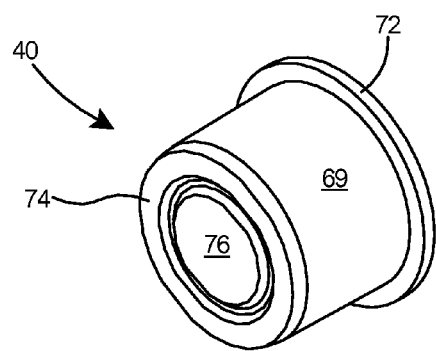
FIG. 17 is a perspective view of a plug that may form a portion of the electrical box assembly of the present invention.

Depending on the particular installation at the job site, any unused hubs 34 can be plugged to block entry of concrete through the hub openings 38. As shown in FIG. 17, each plug 40 includes cylindrical sidewalls 69, a flange 72, an end wall 74, and a knockout 76 in each end wall. The plugs 40, including a large size for plugging a large hub and a small size for plugging a small hub, can be inserted into one of the sockets 36 to block the hub opening 38.

Figure 6:
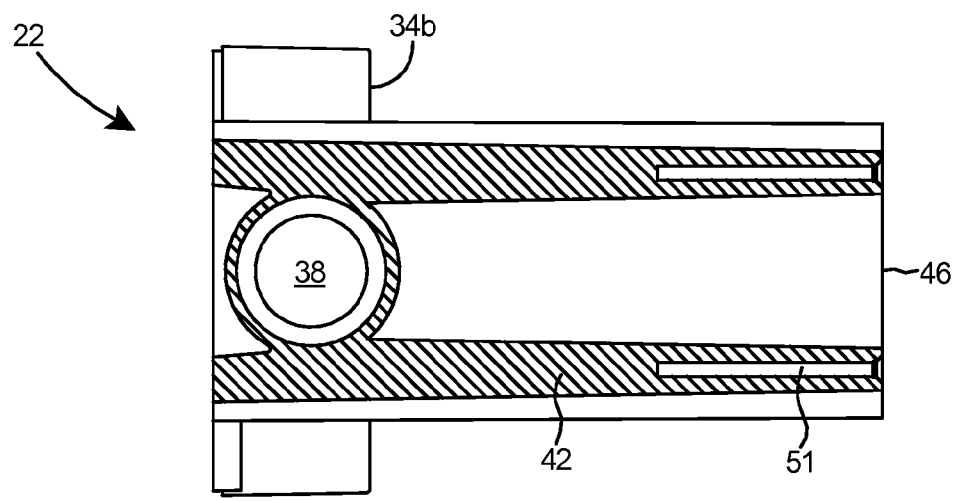
FIG. 6 is a sectional view of the concrete can taken along line 6-6 of FIG. 2.
Figure 7:
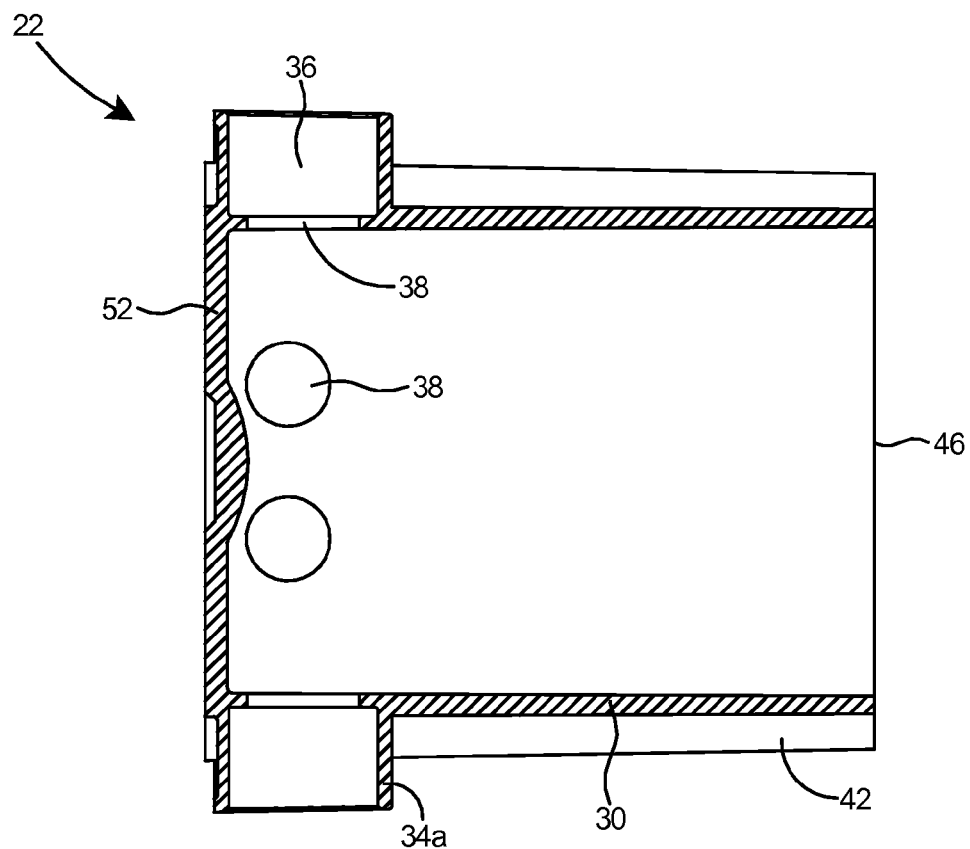
FIG. 7 is a sectional view of the concrete can taken along line 7-7 of FIG. 2.

With reference to various views of the concrete can 22 in FIGS. 4-7, the concrete can is most preferably molded in one piece of plastic. The side walls 30 and 32 of the concrete can 22 must be constructed of a thickness to withstand the weight of poured concrete around the can and prevent the weight of the poured concrete from crushing the can 22. The thickness of end walls 30 and side walls 32 is most preferably at least 0.15 inch. As shown in FIG. 6, the stiffening ribs 42 are most preferably at least 0.37 inch. The bores 51 in the stiffening rib 42 enable fastening of the mounting bracket 24 to the concrete can 22 with fasteners 98 as shown in FIG. 1.

Figure 15:
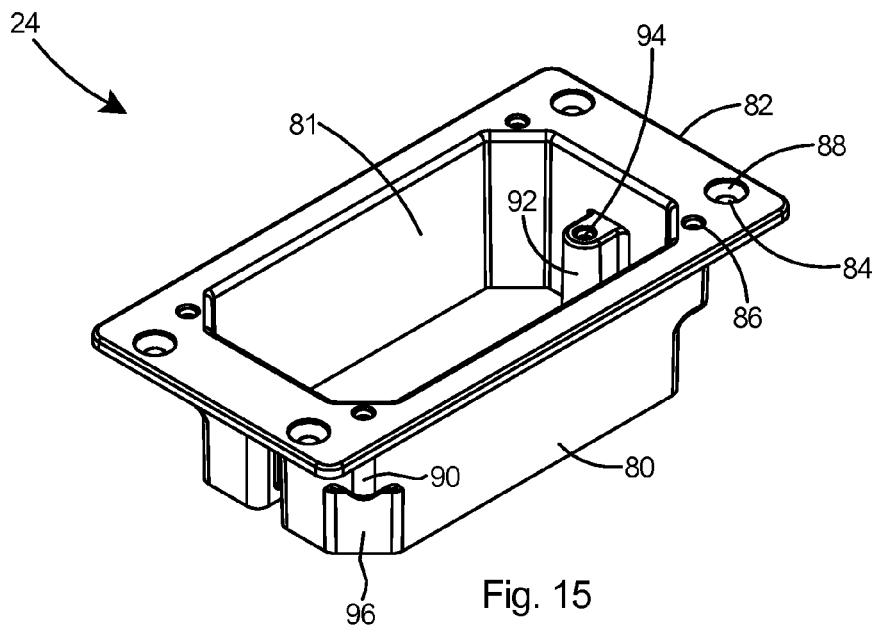
FIG. 15 is a perspective view of a mounting bracket that forms a portion of the electrical box assembly of FIG. 1.

Referring to FIG. 15, the mounting bracket 24 includes sidewalls 80 defining an opening 81 therein, and a peripheral flange 82 having outer apertures 84 and inner apertures 86. Outer apertures 84 include a countersink entry 88 and inner apertures 86 lead into bosses 90. Inner bosses 92 extending from sidewalls 80 include bores 94 therein that provide connection points for connection of an electrical component (not shown) thereto. The portion of the sidewalls 80 below bosses 90 include truncated corners 96 to facilitate easy entry of mounting bracket 24 into the cavity of the concrete can (not shown) when the two are secured together. Outer apertures 84 are for connection of fasteners 98 (see FIG. 1) for securing the mounting bracket 24 to the concrete can 22. Fasteners 98, outer apertures 84 in peripheral flange 82 of mounting bracket 24, and the bores 51 in the concrete can 22 thereby form a fastening arrangement 97 for securing the mounting bracket to the concrete can.

Figure 8:
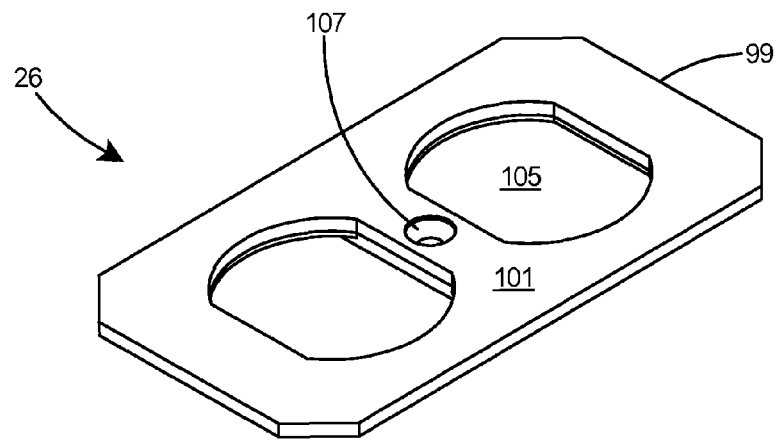
FIG. 8 is a top perspective view of a back plate that forms a portion of the electrical box assembly of FIG. 1.
Figure 9:
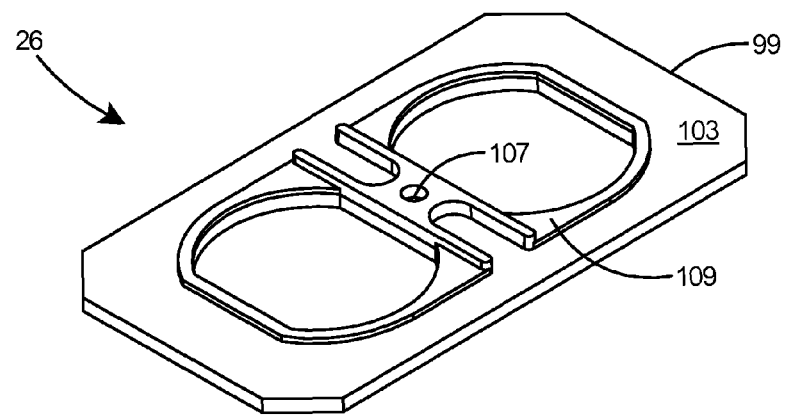
FIG. 9 is a bottom perspective view of the back plate.

Referring to FIGS. 8 and 9, the back plate 26 includes a substantially flat plate 99 having a top side 101, a bottom side 103 and openings 105 to substantially match the plug receptacles of a duplex receptacle (not shown). An aperture 107 passes through the center of the back plate 26. The bottom side includes a raised periphery 109 passing around the outer edge of the openings 105. The raised periphery 109 enables the back plate 26 to seat evenly against a duplex receptacle. As shown in FIG. 1, the back plate includes an outer periphery 110 that nests within the sidewalls of the mounting bracket.

Referring to Figs. FIGS. 10-13, the electrical box assembly includes one or more pairs of spacers 70 such as the preferred embodiment depicted in FIG. 10. The paired spacers 70 are used to adjust the height of the electrical box assembly (see FIG. 1) to the final floor thickness. Each spacer 70 is substantially L-shaped with a base portion 111 and two arms 113 extending from the base portion. Each spacer includes a flat top surface 115, a flat bottom surface 117, and a mating face 119 at the end of each arm 113. A boss 121 extends orthogonally from each arm and includes an aperture 123 therein. Each spacer includes a flange 124 extending outward from the base portion 111. As shown in FIG. 1, when assembling the electrical box assembly 20, the apertures 123 in the pair of spacers 70 are placed in axial alignment with bores 51 in concrete can 22 and also with outer apertures 84 of mounting bracket 24. FIG. 11 depicts a second embodiment of the pair of spacers 125. The distance between top surface 115 and bottom surface 117 in each spacer 125 is less than that of the spacers in FIG. 10; thereby providing a thinner spacer for adjusting the distance of the duplex receptacle a lesser distance above the concrete can (see FIG. 1). When inserting the spacers 70 between the concrete can 22 and the mounting bracket 24 in order to raise the level of the electrical box assembly 20, base portion 111 and arms 113 will nest within the sidewalls 30 and 32 of the concrete can 22 and the flange 124 of spacers 70 will engage the top edge 46 of the concrete can.

With reference to FIG. 1, the electrical box assembly 20 is operated by first deciding on the location desired for a floor electrical box within an area that is formed for a concrete pour. The concrete can 22 is set in the desired location and conduit 127 is installed into hubs 34 as required for the installation. Plugs 40 are installed in any sockets not used for conduit. Conductors (not shown) are pulled through the openings 38 into the concrete can 22. Concrete is then poured around the can 22. After the concrete sets, the can 22 may be trimmed to the finished floor height by cutting with a saw blade. Mounting bracket 24 is then installed on the concrete can 22 using fasteners 98 through outer apertures 84 on mounting bracket into bores 51 in can 22. The duplex receptacle 62 is then wired into the can and bracket assembly. The back plate 26 and cover 28 are then installed by driving fasteners 78 through apertures 66 in cover into inner apertures 86 and bosses 90 of mounting bracket 24. Fasteners 98, apertures 66 in cover 28, and inner apertures 86 and bosses 90 of mounting bracket 24 form an attachment arrangement 126 for securing the cover 28 to the mounting bracket 24. Threaded blanks 68 may be installed in any unused threaded openings 64. Paired spacers 70 may be installed later as required to raise the electrical receptacle 62, including the mounting bracket 24, back plate 26 and cover plate 28 to the level of the final floor thickness. A plurality of spacer pairs 70 of various thicknesses are supplied with the electrical box assembly to enable easy adjustment to various floor thicknesses. The spacers 70 enable the installer to accommodate various floor materials, such as tile, wood, or carpeting by using the spacer that matches the height rise caused by the floor material. As the concrete pour is completed first and a floor material may be added later, providing the spacers in two halves, such as 70a and 70b in FIG. 10, enables the installer to slide each half spacer into place while keeping the fasteners 98 on the opposing side of the box assembly loosely engaged. This enables the installer to maintain axial alignment between the outer apertures 84 in the mounting bracket 24 and the bores 51 in the concrete can 22. After the first half spacer 70a is slid into place and fasteners 98 are loosely tightened, then the fasteners can be removed from the opposing side whereupon second half spacer 70b can be slid into place and tightened, all the while maintaining axial alignment between the outer apertures 84 in the mounting bracket 24 and the bores 51 in the concrete can 22.

Figure 16:
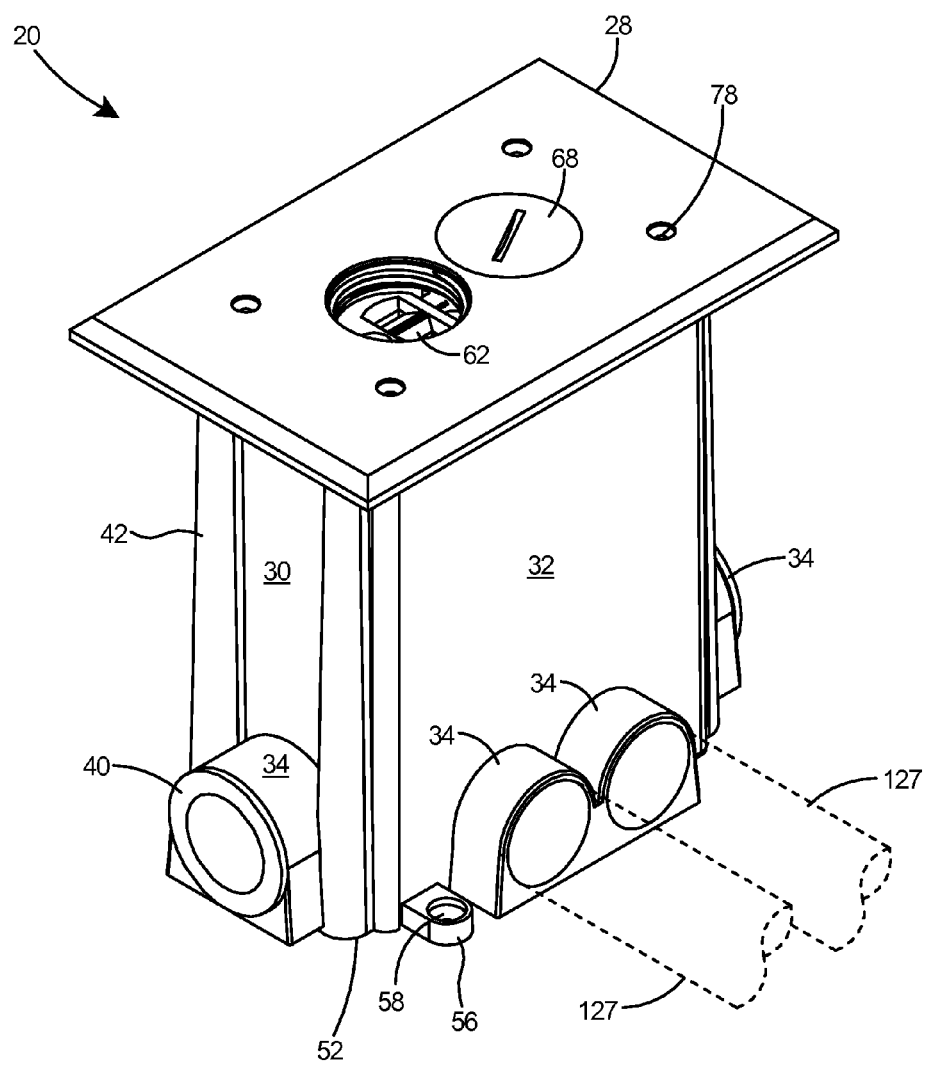
FIG. 16 is a front perspective view of a fully assembled electrical box for concrete poured floors according to the present invention.

The fully assembled electrical box assembly 20 for concrete poured floors is shown in FIG. 16. The walls of the concrete can are most preferably 6 inches in length from the top edge 46 to the back wall 52 (see FIG. 14) to enable use with substantially all depths of concrete pours. The concrete can 22 includes anchor legs 56 on opposing sides 32 of the box at the back wall 52. To aid in stabilizing the concrete can 22 and hold it in place during installation of conduit 127, pulling of electrical cable, wiring, and during the concrete pour, a spike, nail, or similar anchoring rod can be driven through aperture 58 in anchor leg 56 to secure it to the ground.

Figure 18:
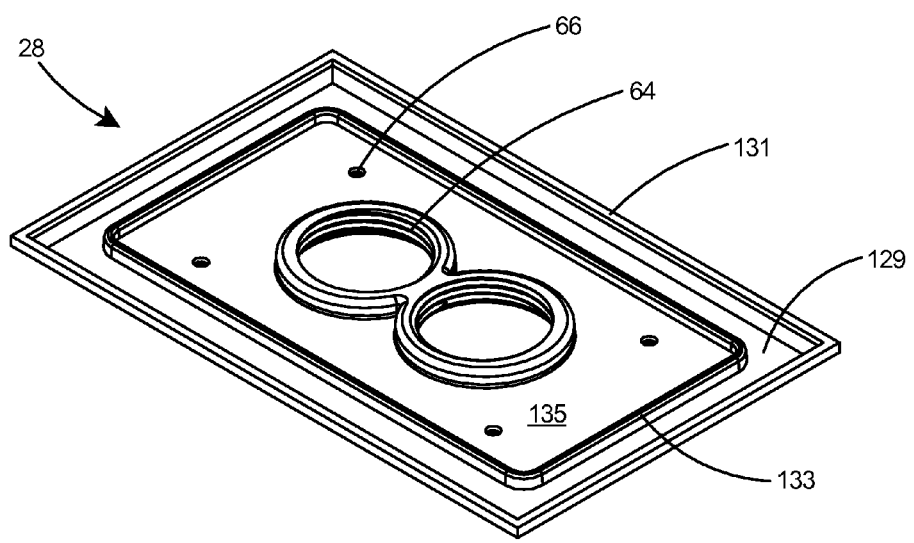
FIG. 18 is a perspective view of the bottom side of a cover plate that forms a portion of the electrical box assembly of FIG. 1.

Referring to FIG. 18, the cover plate 28 includes a bottom surface 129, an outer peripheral wall 131, and an inner peripheral wall 133 extending from the bottom surface. The cover plate 28 includes a flat surface 135 within the inner peripheral wall 133 and the flat surface may include a gasket (not shown) adhered thereto. When cover plate 28 is assembled to the mounting bracket 24 as shown in FIG. 1, peripheral flange 82 of bracket 24 nests within the inner peripheral wall 133 of cover plate. After the electrical box assembly 20 is secured to a floor, outer peripheral wall 131 will be substantially flush with the floor surface.

With reference to FIG. 1, most preferably, the concrete can 22, mounting bracket 24, back plate 26, cover plate 28, and each spacer half of spacer pair 70, are each molded of plastic in one piece. The preferred material of construction of the concrete can is polyvinyl chloride (PVC), which has a high specific gravity and is non-corrosive in a wet environment.

Having thus described the invention with reference to a preferred embodiment, it is to be understood that the invention is not so limited by the description herein but is defined as follows by the appended claims.

What is claimed is:
1. An electrical box assembly comprising:
   a concrete can including four side walls having a top edge and a back wall defining an inner cavity therein;
   a mounting bracket having a peripheral flange and sidewalls, said sidewalls of said mounting bracket adapted to nest within said inner cavity of said concrete can;
   a cover plate having a top surface, a bottom surface, and an inner peripheral wall extending from said bottom surface, said peripheral flange of said bracket adapted to nest within said inner peripheral wall of said cover plate;
   a pair of spacers inserted between said concrete can and said mounting bracket; and
   said pair of spacers enable adjustment of the height of said electrical box assembly with respect to a floor surface.
2. The electrical box assembly of claim 1 including a hub extending from said side walls of said concrete can.
3. The electrical box assembly of claim 2 wherein said hub includes a socket therein and an opening within said socket.
4. The electrical box assembly of claim 3 including a plug for closing off said opening in said socket of said hub.
5. The electrical box assembly of claim 4 wherein said concrete can includes
   a plurality of said hubs; and
   said plurality of said hubs includes hubs to accommodate at least two diameters of electrical conduit.
6. The electrical box assembly of claim 5 including
   two threaded openings in said cover plate; and
   a threaded blank for closing each of said threaded openings in said cover plate.
7. The electrical box assembly of claim 1 including
   a plurality of strengthening ribs extending longitudinally along said side walls of said concrete can; and
   a bore in each of said strengthening ribs.
8. The electrical box assembly of claim 7 including a plurality of outer apertures in said peripheral flange of said mounting bracket.
9. The electrical box assembly of claim 8 including
   a fastening arrangement for securing said mounting bracket to said concrete can; and
   said fastening arrangement including fasteners for securing through said outer apertures in said peripheral flange of said mounting bracket into said bores in said strengthening ribs.
10. The electrical box assembly of claim 8 wherein said mounting bracket includes
   a countersink entry in each of said outer apertures of said mounting bracket; and
   inner bosses extending from said sidewalls of said mounting bracket, each of said inner bosses including a bore therein that provides a connection point for connection of an electrical component.
11. The electrical box assembly of claim 1 including
   a plurality of inner apertures in said peripheral flange of said mounting bracket; and
   a plurality of apertures in said cover plate.
12. The electrical box assembly of claim 11 including
   an attachment arrangement for securing said cover plate to said mounting bracket; and
   said attachment arrangement including fasteners for securing through said apertures in said cover plate into said inner apertures in said peripheral flange of said mounting bracket.
13. The electrical box assembly of claim 1 wherein said concrete can includes
   a bottom edge;
   an anchor leg extending outwards from said bottom edge; and
   an aperture in said anchor leg.
14. The electrical box assembly of claim 1 wherein each spacer in said pair of spacers includes
   a base portion; and
   two arms extending from said base portion.
15. The electrical box assembly of claim 14 wherein said spacer includes
   a flange extending outward from said base portion;
   a boss extending orthogonally from each of said arms; and
   an aperture in said boss.
16. The electrical box assembly of claim 15 wherein
   said base portion and said arms of said spacer are adapted to nest within said side walls of said concrete can; and
   said flange of said spacers is adapted to engage said top edge of said concrete can when said spacers are inserted between said concrete can and said mounting bracket.
17. The electrical box assembly of claim 1 including a back plate inserted between said mounting bracket and said cover plate.
18. The electrical box assembly of claim 17 wherein said back plate includes a substantially flat plate having openings therein to substantially match the plug receptacles of a duplex receptacle; and a bottom side including a raised periphery passing around said openings.

19. The electrical box assembly of claim 18 wherein said back plate includes an outer periphery that nests within said sidewalls of said mounting bracket.

* * * * *